US012559869B2

(12) United States Patent
Salim et al.

(10) Patent No.: US 12,559,869 B2
(45) Date of Patent: Feb. 24, 2026

(54) CARBON FIBERS AND METHOD OF FABRICATION THEREOF

(71) Applicant: University of Pittsburgh—Of the Commonwealth System of Higher Education, Pittsburgh, PA (US)

(72) Inventors: Muhammad Ghassan Salim, Cranberry Township, PA (US); Haitao Liu, Wexford, PA (US); Tevis Davis Jacobs, Pittsburgh, PA (US); Min A Kim, Albany, CA (US); Luke Anthony Thimons, Natrona Heights, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 723 days.

(21) Appl. No.: 17/796,979

(22) PCT Filed: Feb. 4, 2021

(86) PCT No.: PCT/US2021/016530
    § 371 (c)(1),
    (2) Date: Aug. 2, 2022

(87) PCT Pub. No.: WO2021/158733
    PCT Pub. Date: Aug. 12, 2021

(65) Prior Publication Data
    US 2023/0057063 A1    Feb. 23, 2023

Related U.S. Application Data

(60) Provisional application No. 62/969,964, filed on Feb. 4, 2020.

(51) Int. Cl.
    D01F 9/12     (2006.01)
    B82Y 30/00    (2011.01)
    (Continued)

(52) U.S. Cl.
    CPC .............. D01F 9/12 (2013.01); C01B 32/186 (2017.08); B82Y 30/00 (2013.01); B82Y 40/00 (2013.01)

(58) Field of Classification Search
    CPC ....... D01F 9/12; C01B 32/186; C01B 32/194; C01B 32/182; C01B 32/184;
    (Continued)

(56) References Cited

U.S. PATENT DOCUMENTS

2015/0111449 A1*    4/2015    Cruz-Silva ......... B01D 39/2065
                                                    428/688

FOREIGN PATENT DOCUMENTS

WO        WO2021158733        8/2021

OTHER PUBLICATIONS

Salim, Understanding the Effects of Environmental Exposure on Surface Related Properties of Graphene, Graphite, and Rare Earth Oxides, Doctoral dissertation, University of Pittsburgh, pp. 1-97 (2019) (Year: 2019).*

(Continued)

*Primary Examiner* — Daniel C. McCracken

(74) *Attorney, Agent, or Firm* — BARTONY & ASSOCIATES, LLC

(57)              ABSTRACT

A method of forming a fiber includes providing a sheet of a single layer of graphene or an oxidative analogue of graphene and applying force to the sheet to induce bending in the sheet and increase an aspect ratio thereof, thereby forming the fiber.

20 Claims, 6 Drawing Sheets

(51) Int. Cl.
B82Y 40/00 (2011.01)
C01B 32/186 (2017.01)

(58) Field of Classification Search
CPC ..... C01B 32/188; C01B 32/19; C01B 32/192;
C01B 32/196; C01B 32/198; C01B
2204/00; C01B 2204/02; C01B 2204/04;
C01B 2204/06; C01B 2204/065; C01B
2204/20; C01B 2204/22; C01B 2204/24;
C01B 2204/26; C01B 2204/28; C01B
2204/30; C01B 2204/32; C01B 32/20;
C01B 32/205; C01B 32/21; C01B 32/215;
C01B 32/22; C01B 32/225; C01B 32/23;
B82Y 30/00; B82Y 40/00; D01D 5/423
See application file for complete search history.

(56) References Cited

OTHER PUBLICATIONS

Salim Muhammad Ghassan, Understanding the Effects of Environmental Exposure on Surface Related Properties of Graphene, Graphite, and Rare Earth Oxides, Doctoral dissertation, University of Pittsburgh, 2019, pp. 57-69.

Xu, Jie et al., Enhancing the Strength of Graphene by a Denser Grain Boundary, ACS Nano 2018, 12, 4529-4535.

Wang, Bin et al., Controlled Folding of Single Crystal Graphene, Nano Lett. 2017, 17, 1467-1473.

Dai, Zhaohe et al., Hierarchical Graphene-Based Films with Dynamic Self-Stiffening for Biomimetic Artificial Muscle, Advanced Functional Materials 2016, 26, 7003-7010.

Liu, Pingwei et al., Layered and Scrolled Nanocomposites with Aligned Semi-infinite Graphene Inclusions at the Platelet Limit, Science, Jul. 22, 2016, vol. 353, issue 6297, 364-367.

Hwangbo, Yun et al., Fracture Characteristics of Monolayer CVD-Graphene, Scientific Reports, 4, 4439; DOI: 10.1038/srep04439 (2014), 1-9.

Xu, Xiaozhi et al., Ultrafast Epitaxial Growth of Metre-Sized Single-Crystal Graphene on Industrial Cu Foil, Science Bulletin, 2017, 62(15), https://www.researchgate.net/publication/318337251, 1-14.

Xu, Zhen et al., Ultrastiff and Strong Graphene Fibers via Full-Scale Synergetic Defect Engineering, Adv. Mater. 2016, 28, 6449-6456.

Vlassiouk, Ivan et al., Strong and Electrically Conductive Graphene Based Composite Fibers and Laminates, ACS Appl. Mater. Interfaces 2015,7, 10702-10709.

* cited by examiner

Fig. 5
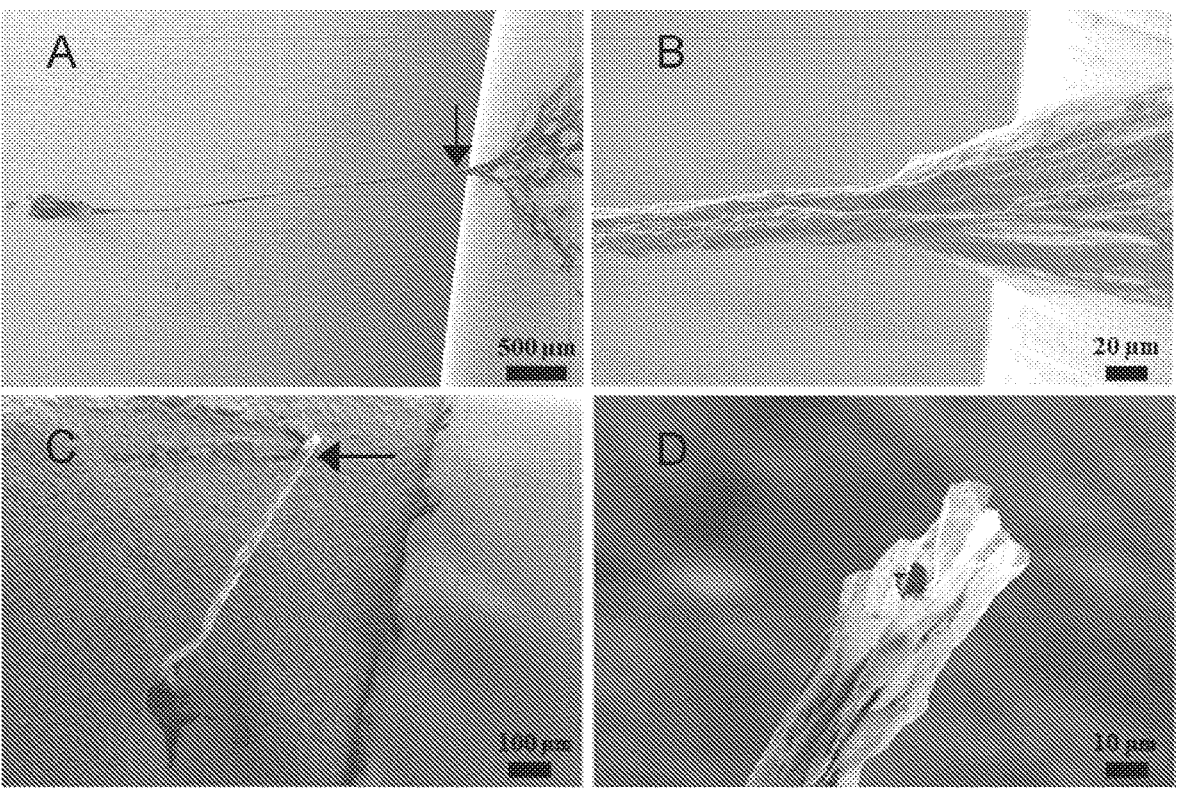
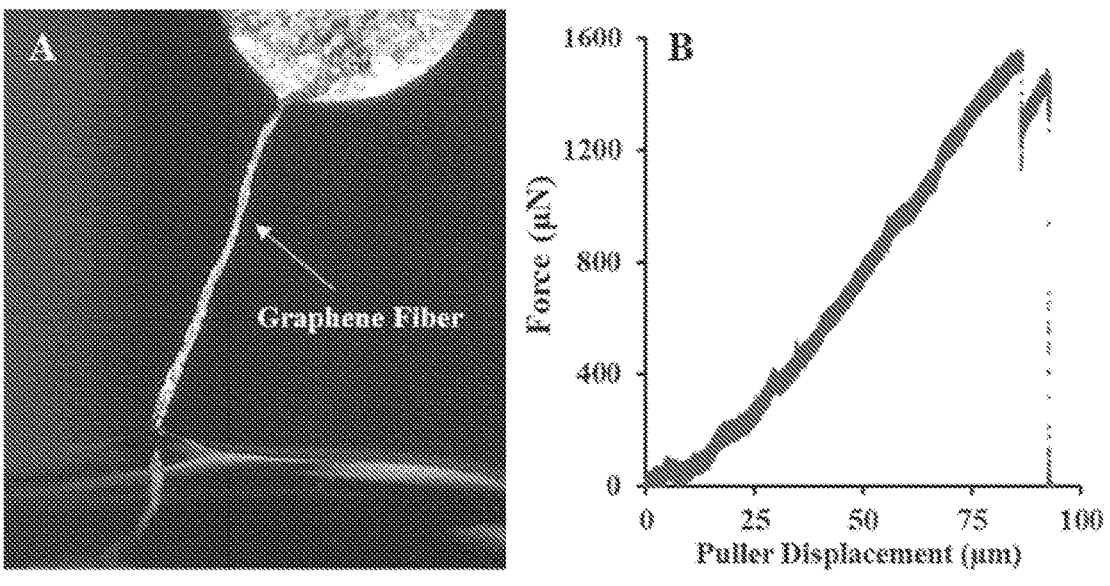
Fig. 6A                    Fig. 6B

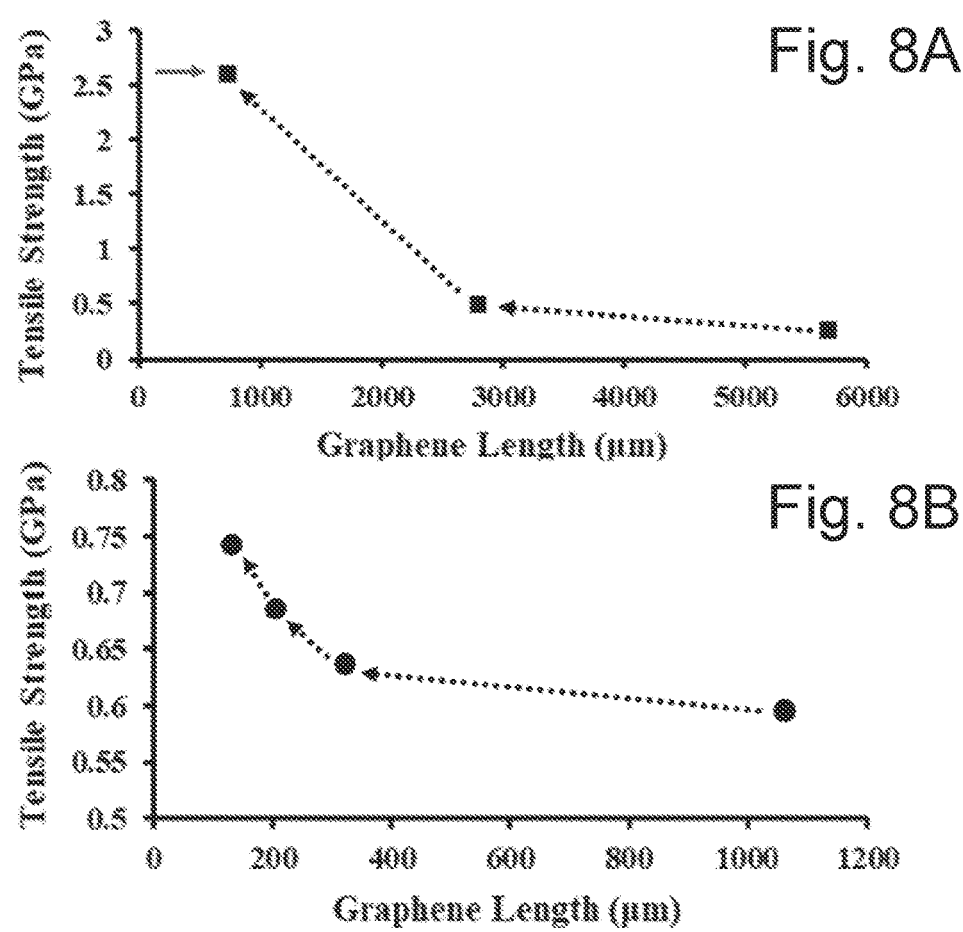
Fig. 8A
Fig. 8B
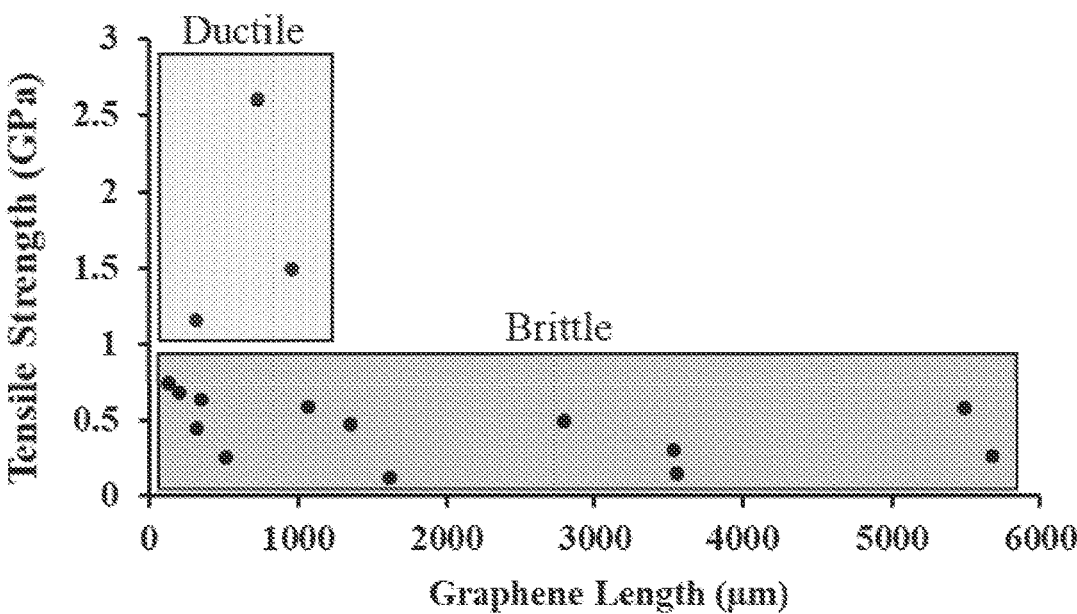
Fig. 9

CARBON FIBERS AND METHOD OF FABRICATION THEREOF

CROSS-REFERENCE TO RELATED APPLICATIONS

This application is a national phase filing of PCT International Patent Application No. PCT/US2021/016530, filed Feb. 4, 2021, which claims benefit of U.S. Provisional Patent Application Ser. No. 62/969,964, filed Feb. 4, 2020, the disclosures of which are incorporated herein by reference.

GOVERNMENTAL INTEREST

This invention was made with government support under grant no. N00014-18-1-2555 awarded by the Office of Naval Research. The government has certain rights in this invention.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Since the first report of the isolation of graphene, researchers have investigated its remarkable mechanical properties. The intrinsic strength of graphene has been predicted to exceed that of any other material. Coupled with its large theoretical specific surface area (2630 m$^2$/g), graphene is a promising reinforcement material in composites.

Early studies of the mechanical properties of graphene were conducted at the nanoscale. In that regard, nanoindentation measurements on graphene reveal an extremely high Young's modulus (E=1.02 TPa) and intrinsic strength ($\sigma_{int}$=130 GPa). Macroscale measurements have also been performed on graphene-based fibers, which are primarily made using graphene oxide. In stark contrast to the nanoscale measurements, the macroscale graphene-oxide fibers show vastly different properties. For example, the highest reported mechanical tensile strength for a graphene oxide fiber is only 2.2 GPa, a factor of 460 times smaller than the nanoscale value.

The very different behaviour between the nanoscale and macroscale measurements may, for example, be explained by the presence of larger critical defects, at which mechanical failure occurs in the macroscale experiments. According to classic fracture theory, the breaking strength of a brittle material is governed by the defects in the material which concentrate the stress to locally exceed the intrinsic strength of its atomic bonds. As an example, comparisons between nano- and macro-scale measurements have been performed for carbon nanotubes (CNTs).

Nanoscale tensile tests of free-standing single-walled CNTs (SWCNTs) and multi-walled CNTs (MWCNTs) have revealed an ideal intrinsic strength of approximately 30 GPa and an elastic modulus of approximately 500-1000 GPa. Tests on MWCNTs were shown to produce intrinsic strength values equivalent to a single SWCNT with diameter equal to the largest MWCNT diameter—this is a result of poor load transfer between CNT layers in MWCNTs.

Macro-scale measurements on MWCNT bundles have shown vastly different properties to their nanoscale counterparts, with an ideal tensile strength of 1.72 GPa and an elastic modulus of 0.45 TPa for lengths of approximately 2 mm. Others have reported an ideal tensile strength of 1.2 GPa and elastic modulus of 16 GPa for double-walled CNT bundles for lengths of approximately 10 mm. Macro-scale measurements on SWCNTs also show the same reduced mechanical behavior to their nanoscale counterpart, with an ideal tensile strength of 1.0 GPa and an elastic modulus of 49-77 GPa for lengths of approximately 200 mm.

The trend in these data show that the mechanical properties of CNTs measured on the macroscale are universally order(s) of magnitude lower than when performed on the nanoscale, a value that is dependent on the scale in which the measurement is performed; a much longer CNT may be more likely to have a critical defect that could lead to a failure present somewhere along their length. Similar behavior has been observed for graphene oxide-based fibers. Some attempts have been made to reduce the gap between the nano- and macro-scale properties.

Graphene-oxide or GO fibers have layered structures. Their critical defects are, in part, related to the local interlayer coupling and the graphene layer alignment. The former determines the nanoscale mechanical strength, and the latter determines the load balancing within the fiber assembly. Under load, stress is focused onto the graphene flakes that are already aligned along the primary fiber axis. At the nanoscale, the failure occurs where the interlayer coupling is the weakest. Based on this model, the mechanical properties of a graphene oxide-based assembly can theoretically be increased by increasing the interlayer coupling between each flake component and improving load balancing. Experimentally, the interlayer coupling can be improved by using large (e.g., millimeter-size) graphene oxide flakes and the load balancing can be improved by pre-aligning the graphene-oxide sheets during assembly of the fiber structure. However, despite such efforts, the macroscale mechanical strength of graphene oxide is still approximately three orders of magnitude lower than the nanoscale value, with the currently highest reported value being 2.2 GPa.

SUMMARY

In one aspect, a method of forming a fiber includes providing a sheet of a single layer of graphene or an oxidative analogue of graphene and applying force to the sheet to induce bending in the sheet and increase an aspect ratio thereof, thereby forming the fiber. The method may, for example, include positioning a sheet of graphene or an oxidative analogue of graphene on a surface, positioning a first abutment member on a first side of the sheet and a second abutment member on a second side of the sheet, and applying force to at least one of the first abutment member and the second abutment member to induce bending in the sheet to decrease a width of the sheet and increase an aspect ratio thereof, thereby forming the fiber. In a number of embodiments, the oxidative analogue of graphene is graphene oxide or reduced graphene oxide of the single-layer sheet hereof. In a number of embodiments, chemical vapor deposition is used in forming the sheet. Chemical vapor depositions provides for formation of relatively large sheets. The sheet may, for example, be formed upon a layer of a metal such as copper. The graphene sheet may, for example, have a specific surface area of at least 100 m$^2$/g, 800 m$^2$/g, or 1000 m$^2$/g, or at least 2500 m$^2$/g.

In a number of embodiments, the method further includes forming a polymer layer on the sheet before applying force thereto (through the abutment members). The polymer layer may, for example, include polymethyl methacrylate, polystyrene, or polycarbonate. In other embodiments, the polymer layer may, for example, consist essentially of or consist of polymethyl methacrylate, polystyrene, or polycarbonate.

In the case that the sheet is formed on a material (for example, during chemical vapor deposition), the layer of material may be removed prior to applying force. For example, in the case of that the sheet is formed on copper, the layer of copper may be removed prior to applying force to the sheet to induce bending in the sheet and increase the aspect ratio thereof. A material such as copper may, for example, be removed by etching.

In a number of embodiments, the method further includes removing the polymer layer after applying force to the sheet to induce bending in the sheet and increase the aspect ratio thereof. The polymer layer may, for example, be removed via heating the fiber to a temperature above a temperature at which thermal degradation of the polymer layer occurs.

In a number of embodiments, the fiber has an average or nominal diameter no greater than 500 μm, no greater than 250 μm, no greater than 100 μm or no greater than 50 μm. In a number of embodiments, the fiber has an average or nominal diameter of 10 μm or greater. In a number of embodiments, the fiber has a length of at least 0.5 mm, 1 mm, at least 1 cm, at least 10 cm, or at least 100 cm. In a number of embodiment, the fiber or a portion thereof created by fracture under tension has a mechanical tensile strength greater than 1.45 GPa.

In a number of embodiments, bending may be induced to create folds in the sheet as described above. In a number of other embodiments, bending may be induced to create folds via rolling of the sheet or via twisting of the sheet. In a number of embodiment, bending is induced to create folds in the sheet or to create twisting in the sheet.

In another aspect, a fiber includes a sheet of a single layer of graphene or an oxidative analogue of graphene in which bending has been induced in the sheet to increase an aspect ratio thereof, thereby forming the fiber. The fiber may, for example, have a nominal diameter no greater than 500 μm, no greater than 250 μm, no greater than 100 μm or no greater than 50 μm. In a number of embodiments, the fiber has a nominal diameter of 10 μm or greater. In a number of embodiments, the fiber has a length of at least 0.5 mm, 1 mm, or at least 1 cm, at least 10 cm or at least 100 cm. In a number of embodiments, the fiber has a mechanical tensile strength greater than 1.45 GPa. In a number of embodiments, bending is induced to create folds in the sheet, to create rolling in the sheet or to create twisting in the sheet. In a number of embodiments, the sheet has a specific surface area of at least 100 m²/g, 800 m²/g, at least 1000 m²/g, or at least 2500 m²/g. In a number of embodiments, the fiber is formed by positioning a sheet of graphene or an oxidative analogue of graphene on a surface, positioning a first abutment member on a first side of the sheet and a second abutment member on a second side of the sheet, and applying force to at least one of the first abutment member and the second abutment member to induce bending in the sheet to decrease a width of the sheet and increase an aspect ratio thereof.

In a further aspect, a material include a plurality of fibers hereof. The fibers may be used to form a material or may be used in a composite material. The fiber provide high strength and low weight. The fibers hereof may also provide electrical conductivity. In a number of embodiment, the fibers may be made into yarns. In other embodiments, the fibers may be used as fillers. In general, in a number of embodiments, the fibers hereof may provide utility similar to carbon fibers. The fibers may, for example, be used in reinforcing composite materials (for example, in connection with fibers, polymers and metals), in textiles, in electrodes and in many other uses.

The present devices, systems, methods and compositions hereof, along with the attributes and attendant advantages thereof, will best be appreciated and understood in view of the following detailed description taken in conjunction with the accompanying drawings.

BRIEF DESCRIPTION OF THE DRAWINGS

FIG. 5 illustrates SEM images of two graphene fibers (images A/B and images C/D), wherein SEM image A illustrates a suspended graphene fiber after annealing on a copper substrate to remove its polymer backing; image B illustrates the fiber from image A (at the location marked with an arrow in image A) at a higher magnification, wherein the fiber has a diameter of approximately 20 μm; image C illustrates a broken graphene fiber after tensile testing, wherein the fiber was mounted with an adhesive that was coated with conductive silver paste to facilitate SEM imaging; and image D illustrates the fiber from image C (at the location marked with an arrow in image C), showing the open, porous cross-section of the fiber which results upon removal of the polymeric layer from the fibers hereof.

FIG. 6A illustrates an optical image of a macroscale graphene fiber tested in uniaxial tension ($A_{graphene}=3.18$ μm², $L_{fiber}=2952$ μm).

FIG. 6B illustrates a force-displacement plot of uniaxial tensile testing (puller displacement rate $r_p=0.50$ μm/s), wherein the illustrated fiber exhibited brittle fracture, with a tensile strength of 0.475 GPa.

FIG. 8A illustrates a plot of breaking strength of graphene fibers as a function of fiber length wherein the dashed or broken arrows indicate the order of sequential uniaxial tensile tests on the same fibers with $A_{graphene}$=3.2 μm², and the solid arrow indicates where ductile fracture behavior was observed.

FIG. 8B illustrates a plot of breaking strength of graphene fibers as a function of fiber length wherein the dashed or broken arrows indicate the order of sequential uniaxial tensile tests on the same fibers with $A_{graphene}$=5.2 μm².

FIG. 9 illustrates a plot of breaking strength for 16 measurements on parent and fragment fibers, wherein three fiber fragments exhibited ductile behaviour and exhibited the largest measured breaking strengths. Brittle fracturing behaviour was observed for most fibers.

DETAILED DESCRIPTION

Figure 1:
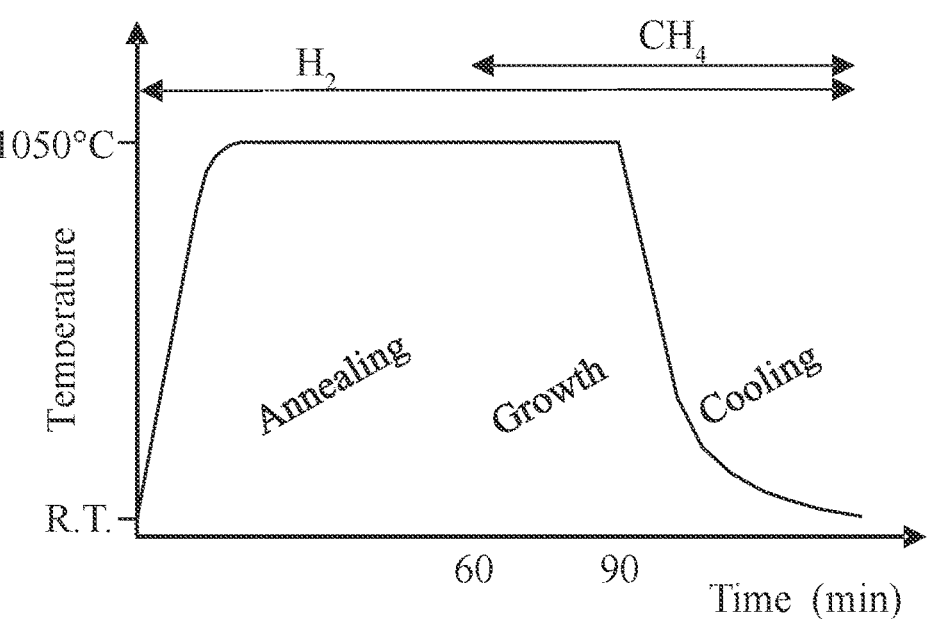
FIG. 1 illustrates chemical vapor deposition or CVD growth of graphene wherein the furnace temperature was set to 1050° C., the annealing and growth periods were 60 min and 30 minutes, respectively, $H_2$ and $CH_4$ flow rate were set to 10 sccm and 2 sccm, respectively, and the quartz tube had base pressure of ~50 mTorr after evacuation, ~500 mTorr with $H_2$, and ~750 mTorr with $H_2+CH_4$.

It will be readily understood that the components of the embodiments, as generally described and illustrated in the figures herein, may be arranged and designed in a wide variety of different configurations in addition to the described representative embodiments. Thus, the following more detailed description of the representative embodiments, as illustrated in the figures, is not intended to limit the scope of the embodiments, as claimed, but is merely illustrative of representative embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a polymer" includes a plurality of such polymers and equivalents thereof known to those skilled in the art, and so forth, and reference to "the polymer" is a reference to one or more such polymers and equivalents thereof known to those skilled in the art, and so forth. Recitation of ranges of values herein are merely intended to serve as a shorthand method of referring individually to each separate value falling within the range. Unless otherwise indicated herein, and each separate value, as well as intermediate ranges, are incorporated into the specification as if individually recited herein. All methods described herein can be performed in any suitable order unless otherwise indicated herein or otherwise clearly contraindicated by the text.

Any method of producing a sheet of graphene or an oxidative analogue of graphene having a length equal to or exceeding the length of the fibers hereof is suitable to form such sheets. As known in the art, high quality graphene layers or sheets may be grown epitaxially on a substrate (for example, upon a metal substrate such as copper) via chemical vapor deposition of CVD. In a number of embodiments, a chemical vapor deposition or CVD method is used to from graphene layers or sheets. CVD can, for example, produce very large (for example, millimeter, centimeter or even meter-sized) single-crystal graphene. CVD graphene (or oxidative analogues of graphene) samples can also be folded just like a macroscale object and such a process can produce highly aligned graphene sheets. It was hypothesized that, for example, a macroscopic graphene fiber made entirely from a single sheet of CVD-formed graphene (or an oxidative analogue of graphene) may offer significantly improved mechanical performance.

Graphene oxide sheets may, for example, be fabricated via oxidation of graphene sheets using oxidative methods known in the art, followed by sonication water. Reduced graphene oxide sheets may, for example, be made by chemical reduction of graphene oxide sheets.

In representative embodiments hereof, the fabrication of a fiber or fibers made from a single sheet of CVD graphene or an oxidative analogue of graphene is disclosed. The mechanical properties of such fibers were also studied. The highest effective tensile strength measured from such samples was 2.67 GPa, which is believed to be the highest value reported for graphene-based fibers. In a number of representative embodiments, the fabrication and mechanical properties of macroscale fibers (for example, having diameters of 10-500 μm (or 10 to 100 μm) and lengths of 0.1-2.0 cm) prepared from a single sheet of single-layer graphene grown by chemical vapor deposition (CVD) are set forth. Diameters/nomina diameters of fibers hereof may, for example, be determined by measurement of the width of the fiber after folding via optical microscopy and/or electron microscopy. As used herein, the term macroscale refers to fiber lengths of 0.1 cm (1 mm) or greater. The length of fibers hereof can extend to millimetres, centimetres or even meters. The average breaking strength of the fibers was 1.75 GPa±0.62 GPa with (as described above) the best sample having a strength of 2.67 GPa with a 1-mm gauge length. Understanding the mechanisms behind the superior mechanical strength of the graphene fibers hereof is expected to enhance the potential application of such materials as a reinforcement in composites.

Representative graphene fibers were fabricated by physically bending or forming bends in (for example, folding, rolling, twisting, etc.) a single sheet of single-layer CVD graphene into a fiber, filament or wire shape. In general, force is applied to a single sheet of graphene (or an oxidative analogue thereof) to decrease one dimension thereof, thereby increasing the aspect ratio. During folding in a number of studies, the graphene was supported by a thin layer of polymer such as polymethyl methacrylate (PMMA). The PMMA was then removed by annealing at 420° C., which is above the thermal decomposition temperature of PMMA (390° C.). Since only a single CVD graphene sheet is used for each fiber, the dimensions of the flat graphene sheet can be used to calculate the ideal cross-sectional area of the graphene in the fiber ($A_{graphene}$) by using the width (prior to folding) of the graphene sheet and the thickness of graphene (0.335 nm). For a 1-cm-wide CVD graphene sheet, the ideal cross-sectional area is 3.35 $\mu m^2$. The ideal cross-sectional area was used in in determining an ideal strength. In that regard, the ideal strength was based on the area of only the graphene in the fiber, and not upon the area of interstitial space/air between folds of the graphene. In a number of studies of preparation of fibers of different lengths and nominal diameters, the original dimensions of the graphene sheet varied in the range of approximately 2.5 cm×2.5 cm to approximately 2.5 cm×3.75 cm.

A polymer layer such as a PMMA layer may also be removed via dissolving in an appropriate solvent as known in the art. However, removal via thermal decomposition is significantly better that the use of a solvent. For example, thermal decomposition is much faster and more amenable to a continuous or semi-continuous process (for example, on long fibers). A solvent removal process may take hours or even days and is not well suited for continuous processes. Further, folding of the graphene layers or sheets hereof may limit access of a solvent to portions of the polymer layer within, for example, inner folds, resulting in residual polymer remaining.

In a number of studies, graphene was grown on copper foil (25 $\mu m$ thick, Alfa Aesar, item No. 46365) using a CVD method. First, copper foil was electropolished. In that regard, copper foil was electrolyzed at 8 V with the current limit of 0.45 A for 30-45 s in phosphoric acid solution (500 ml of deionized water, 250 ml of phosphoric acid, 250 ml ethanol, 50 ml isopropyl alcohol, and 5 g of urea). Copper foil was used for both anode and cathode electrode, but only polished anode copper foil was used for graphene growth. After the electropolishing treatment, the copper foil was thoroughly rinsed with deionized water, blow dried with nitrogen gas, and placed on a quartz boat. The quartz boat with the copper foil was then inserted into the centre of a 1-inch-diameter fused quartz tube furnace. The tube was pumped down to a base pressure of approximately 50 mTorr and back filled with $H_2$ (10 standard cubic centimetres per minutes (sccm)). The tube pressure with $H_2$ flow was maintained at ~500 mTorr. The furnace temperature was ramped to 1050° C. and the samples were annealed for 1 h. Methane ($CH_4$; 2 sccm, $P_{total}$~750 mTorr) was introduced after the annealing step for 30 min (growth), and the furnace was cooled rapidly to room temperature with the same gas flow. FIG. 1 summarizes the CVD growth process. Graphene samples were stored in a clean glass petri dish until transfer.

Figure 2:
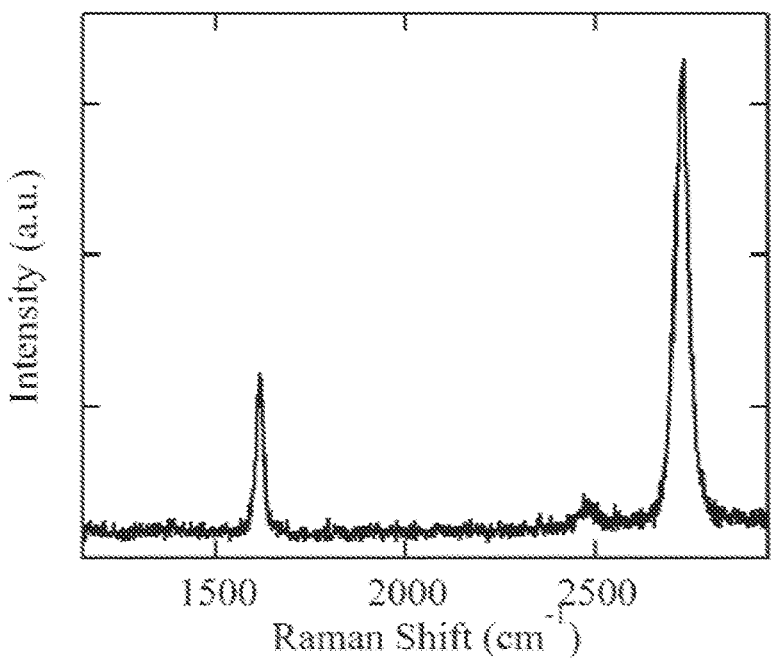
FIG. 2 illustrates the Raman spectrum of graphene on $SiO_2/Si$ wafer.

CVD-grown graphene was transferred onto a silicon wafer using a wet transfer technique and characterized via Raman spectroscopy. Micro-Raman spectra were obtained using Horiba scientific XploRA PLUS with Olympus Microscope BX41 with 100× (NA:0.9, WD:0.21 mm) objective lenses. A 473 nm (20-25 mW) continuous wave laser with a 10% density filter and an 1800 gr/mm grating was used. The slit and pin hole sizes were 100 $\mu m$ and 300 $\mu m$, respectively. Laser power and acquisition time settings were adjusted to prevent the oxidation of graphene from the laser induced heating effect. A typical Raman spectrum of graphene is shown in FIG. 2. The negligible D peak intensity, low intensity ratio between the G peak and the 2D peak ($I_G/I_{2D}$), and narrow linewidth of the 2D peak indicated that the CVD graphene used in the study was mostly single layer and exhibited low defect density. In general, it is desirable that graphene used in the devices, systems, methods and composition hereof exhibit low defect density, but it is not required that such graphene be pristine. Defects in the plane and/or on the edges may be present. Likewise, some areas of multiple layers may be present. In general, CVD-graphene is suitable for use herein.

Figure 3A:
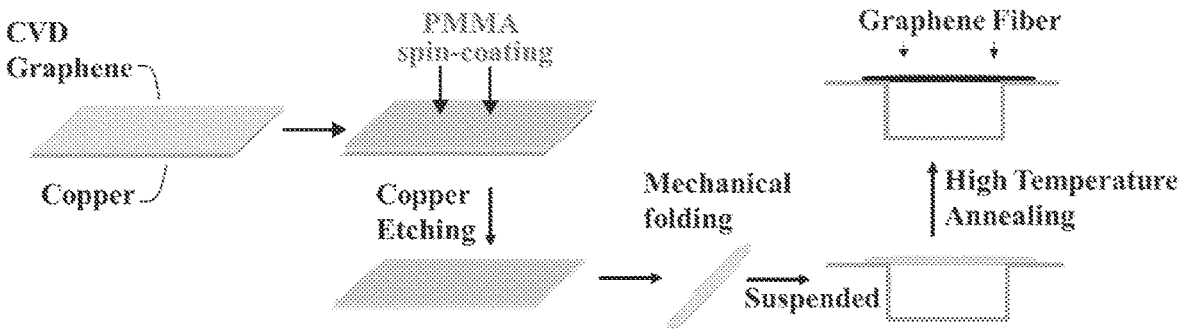
FIG. 3A illustrates schematically a folding process for PMMA-Coated Graphene wherein glass plates were treated by UV/$O_3$ prior to wetting or graphene transfer onto plate, showing that wrinkles formed in the graphene sheet during compression and remained as the sheet was compressed further.

In a typical wet transfer methodology, as-grown graphene on top of Cu foil was spin coated with 5 wt % polymethylmethacrylate or PMMA solution (PMMA, Aldrich, MW 996000 in anisole, Sigma-Aldrich, 99%) as illustrated in FIG. 3A. After the PMMA was coated on top of the graphene layer, the Cu foil was etched in etchant solution of 1 M of iron chloride in 10% w/w hydrochloric acid ($FeCl_3$, Sigma-Aldrich, 97%, in HCl, Fisher Scientific, 37.1%) for 30 min. Then, the PMMA/graphene film was scooped out with a clean glass slide and transferred into multiple water baths to rinse off the etchant. After thorough rinsing, the PMMA/graphene film was scooped on a $SiO_2$(300 nm)/Si wafer (University Wafer, 300 nm wet thermal oxide, P type/Boron) and spin dried at 5000 rpm for 5 min. The PMMA layer was removed by placing the sample in an acetone bath for 1 h. The graphene surface was rinsed with isopropanol and gently blow dried with $N_2$. In general, it is desirable to minimize the thickness of the polymer layer of film. One may, for example, use the minimum amount of polymer (for example, PMMA) required to keep graphene intact during processing (for example, transfer and folding). Increasing thickness of the polymer layer or film results in an increase of bend radius during bending/folding, which has a negative effect on creating an accordion-like fold. However, as the polymer layer becomes thinner, it can be more easily damaged during handling or processing. A thinner polymer can assist in forming a more compact accordion-like structure during folding, but in forming the tightly packed thin fiber structures hereof, the drying/thermal decomposition process also plays an important role. An extremely thin polymer layer is not necessary. In a number of embodiments, the polymer layer of film may, for example, be in the range of 10 to 100 $\mu m$ in thickness.

Figure 3B:
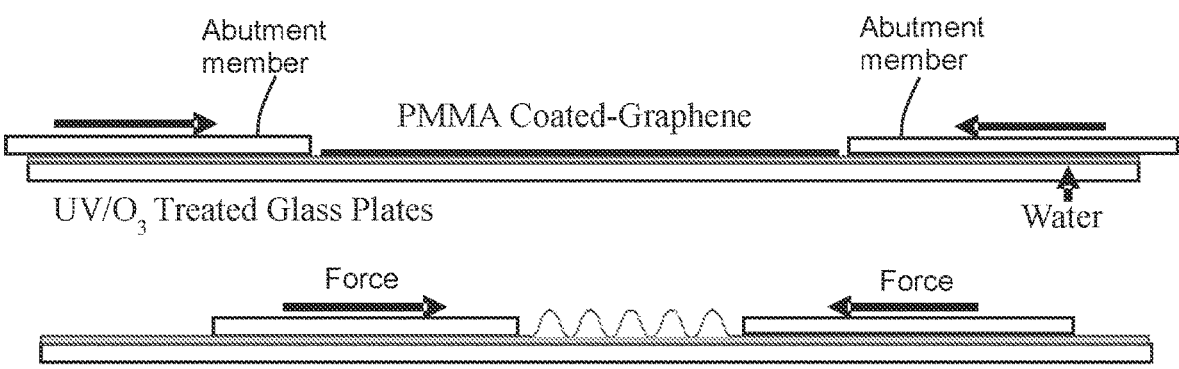
FIG. 3B illustrates schematically a fabrication scheme of graphene fibers wherein single sheets of CVD graphene are used to fabricate graphene fibers through steps of copper etching, mechanical folding, and high temperature annealing to decompose and remove the supporting organic film.

Graphene fiber was created in a number of representative embodiments by folding a flat sheet of graphene on a glass slide. In a typical assembly, graphene/Cu was spin coated with 3-5 wt % PMMA solution and Cu foil was etched as described above. The PMMA/graphene film was rinsed in water bath and placed on a clean glass plate. Then the film was pushed horizontally with an abutment member or contact member (for example, clean glass slides) to form a folded structure. In that regard, a contact member of abutment member was place on each lateral side of the PMMA/graphene film or sheet. Force (represented by arrows in FIG. 3B) was applied to one or both of the abutment members to result in an accordion-like, Z-like or pleat-like folding of the PMMA/graphene sheet, significantly decreasing the width of the PMMA/graphene sheet and increasing the aspect ratio thereof. All glass plate and slides were thoroughly cleaned and treated with $UV/O_3$ (PSD Pro Series UV-Ozone System, Novascan) for 1 hr to increase the wetting property thereof before use. A schematic illustration of the folding process is shown in FIG. 3B.

To remove a polymer support such as PMMA, the folded PMMA/graphene fiber was heated beyond the thermal decomposition temperature of PMMA (390° C.). First, PMMA/graphene fiber was suspended on a copper foil and placed in a quartz tube (see FIG. 3A). Once the tube was evacuated (P~50 mTorr), PMMA/graphene fiber was heated to 420° C. for 30 min in Ar (P>1 Torr). The system was cooled to room temperature, and graphene fiber was stored in a plastic petri dish until further testing.

A PMMA supported graphene sheet as described above, was also formed into a fiber by rolling. In a number of studies, the PMMA-supported graphene was picked up via a copper wire and rolled up into a scroll form. The wired/scroll was placed in iron chloride solution to remove the center copper wire. The PMMA layer was then removed by acetone bath followed by thermal annealing. A folding pattern and procedure such as that illustrated in FIG. 3B provides for ready desorption of the supporting polymer layer from the graphene surface during the annealing process. A fiber formed by rolling of a polymer-supported graphene sheet may result in gasses becoming trapped and accumulating within the structure during annealing. In the case that a polymer support layer is to be removed by annealing, it is desirable to maximize accessible surface area for release of gasses during annealing. In addition to other folding or bending techniques, methodologies of increasing aspect ratio such as twisting or spinning provide high accessible surface area. Moreover, increased accessible surface area (in addition to high specific surface area provided by graphene and oxidative analogues thereof) provide for improved material interaction and improved material properties (when compared to materials with low accessible surface area and/or lower specific surface area) when the compositions hereof are used in composite materials.

Creating folds in a graphene layer or sheet via mechanical folding between abutment members is well suited for manufacturing techniques, including continuous or semi-continuous manufacturing techniques. Further, such a mechanical folding technique provides high accessible surface area and sufficient void volume between folds for adequate gas removal during thermal decomposition of a polymer layer.

Figure 4:
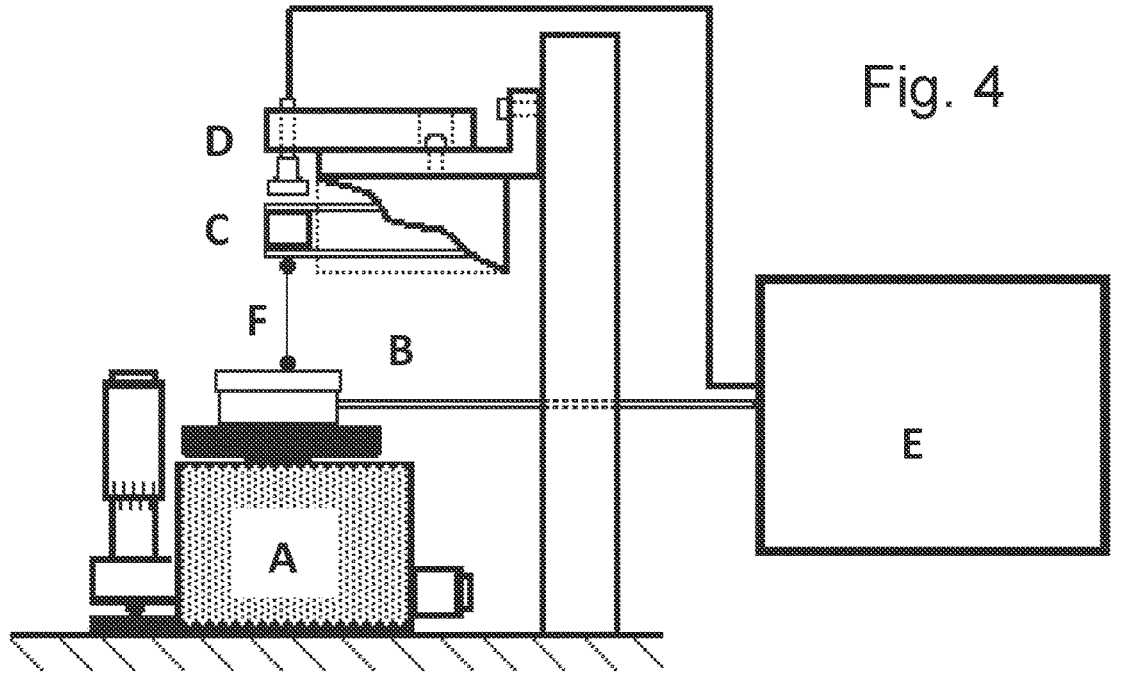
FIG. 4 illustrates a testing setup (A) for contact tests depicting the three-axis motor-driven stage; (B) the piezoelectric actuator; (C) the cantilever with bead of epoxy; (D) the capacitive sensor; (E) and the corresponding controls; and (F) graphene fiber mounted with beads of adhesives.

Tensile measurements were collected using a custom-made tensile testing setup shown schematically in FIG. 4. The experimental setup was positioned on a vibration isolation table (a Kinetic Systems, Minus K negative stiffness vibration isolator) in ambient conditions (22° C. and 20-30% relative humidity). The setup employed a cantilever beam of known stiffness (882 N/m) coupled with a capacitive displacement sensor (Physik Instrumente, D-510.010) to measure applied force with an accuracy of +/−25 $\mu$N. A newly fabricated graphene fiber, which still anchored to the copper substrate where it was annealed, had one end of it raised into a droplet of epoxy (Devcon No. 14250) on the tip of the cantilever via a three-axis stage (Aerotech MPS75SL-V). The epoxy was allowed 45 min to 1 hour to harden before testing. Sequential measurements on the same mounted graphene fiber were performed by lowering the newly broken end of the graphene fiber into a pool of CRYSTAL-BOND™ mounting adhesive (Ted Pella, Inc. 509-3) (heated to 150° C., past its softening point). Ideally the samples would be aligned perfectly vertically, parallel to the loading axis to maximize tensile strength. However, this was not always the case, and the studied fibers were occasionally mounted up to 35° off axis as a result of physical limitations of the rigid fibers.

Once the graphene fiber was mounted as described above and adhesives had hardened, the three-axis motorized stage was lowered. This movement created a tensile load on the sample which was registered by the cantilever beam/capacitive sensor. The loading occurred at rates ($r_p$) varying between 0.1-2 $\mu$m/s until fracture, with data sampling at (1000 data points/sec). The displacement of the stage was recorded along with the displacement and corresponding force of the cantilever beam. The stage was lowered until fracture was observed. The broken samples were preserved for later SEM imaging. After fracture, another test was carried out on the graphene fiber still attached to the epoxy on the cantilever beam. The broken end was then lowered into liquid crystalbond adhesive on the stage. Again, the crystalbond was allowed to harden completely before applying any load to the sample. After each fracture, the new, shorter fragment sample was reattached to a new pool of crystal bond adhesive on the stage, allowed to harden, and then pulled until fracture. This process was repeated until the sample was too short to test again.

Data was collected on the stage displacement and the force exerted on the sample with respect to time by using a National Instruments DAQ unit (NI USB-6009) and the LabView development environment. Video and pictures were taken for each test with a digital microscope (Dinolite AM4515ZTL). The experimental setup allowed for strain data to be extracted from the video and total mechanical failure to be observed. Such data was gathered several times for each sample over the course of multiple tensile tests.

The mounted graphene fibers were typically set an angle (0-35° to vertical—that is, the orientation of the gravitational field) as a result of restrictions in fabrication and mounting. Any load in the fiber where the sample was straight would be along the axis of the fiber. If the fiber doesn't break at the bends in the sample, then the entire load is supported along the axis of the fiber. Since only vertical deflection (force) was measured, the measured values will be an underestimate of the real force experienced by the fiber, which will also cause some horizontal deflection. Additionally, the fibers were usually slightly bent or kinked along their axis, some of which are can been visually observed to unravel during testing. Displacements measured during testing are affected by both the angle of setting and bends/kinks along the fiber axis. Force-Time plots were used (over F-AD plot) to help display the data because of these issues. Stress-strain curves were generated by measuring distances between reference points on the graphene fiber at instantaneous moments during the test by digital imaging.

Graphene wires or fibers hereof were characterized by field-emission Scanning Electron Microscopy (SEM) using a Zeiss Sigma 500 VP SEM. Conductive silver paste (Silver Conductive Adhesive 503, Electron Microscopy Sciences) was added over the non-conductive epoxy or crystal bond adhesives to eliminate charging during the SEM imaging of graphene fibers.

SEM images of graphene fibers are shown in FIG. 5. The typical nominal diameter of the studied fibers was between 10-100 $\mu$m, with an open, porous cross-section which results after removal of the polymer layer from the fibers hereof. There is both lateral and axial folding of graphene observable by scanning electron microscopy (SEM). Upon uniaxial tensile testing, an unravelling of the axial folds is expected. The initial length of the graphene fibers ($L_{fiber}$), after fabrication, was measured with a digital microscope and were in the range of 0.1-2 cm.

The fibers produced after the folding process are wider than the corresponding fibers after thermal treatment. The decrease in width/nominal diameter is partly a result of PMMA being removed from graphene. The structure becomes more compact upon removal of the polymer layer. A suspended non-folded graphene sheet will entirely collapse after thermal annealing. However, after folding a degree (which is determinable for a given composite polymer/graphene material), the structure will remain intact and a strong fiber will be formed. In general, it was observed that the more uniform and tighter the fold, the better the properties of the resulting fiber. The fibers formed in the present studies were not optimized. An ideal lowest limit fold possible may, for example, be determinable based on a calculation of the polymer/PMMA thickness plus graphene thickness and the number of folds. There is, however, some resistance from polymer (for example, PMMA) to being folded. In a number of studies hereof, the produced polymer/graphene composite fibers were within a range of approximately 0.75 mm to 1.75 mm in width. A width less than 0.75 mm will produce successful fibers. At some point for the sheets studied, however, a greater width (for example, in excess of 3 mm) would be undesirable. Before the thermal annealing process, the aspect ratio of the polymer/graphene composite fiber was in the range of approximately 15-55. After annealing, the aspect ratio of the graphene fiber was in the range of approximately 250-2500 (for fibers having a measured width/nominal diameter in the range of approximately 10 μm to 100 μm. In general, the decrease in width that occurs between the original graphene sheet and the polymer/graphene fibers (prior to thermal annealing/decomposition) hereof is at least 85%, at least 88%, at least 96%, or at least 98%.

The fibers were directly mounted onto and tested with a custom uniaxial testing setup of FIG. 4. The force F was measured as a function of time until the fibers broken. As described above, after the fiber was broken, the testing was repeated with the resulting fiber segments until they were too small to be easily handled and mounted. The stress was calculated as $F/A_{graphene}$ and the strain as $\Delta L/L_0$. The modulus of the fibers $K_{fiber}$ was determined from the slope of the initial linear portion of the stress-strain curve, and the ultimate tensile strength was taken as the highest measured stress.

Two distinct types of fracture behavior in the graphene fibers were observed near the maximum load. The first type, herein referred to as brittle, is associated with rapid breaking of the fiber after fracture initiation. In this case, the corresponding force-distance curve shows an instantaneous vertical drop in the force from breaking strength to baseline. The second type, herein referred to as ductile, involves an observable propagation of a fracture across the width of the fiber, the initiation of which correlates to a plateauing of the measured force in the force-distance curve.

In measurements from the studies hereof, the brittle fractures occurred on long fiber segments and resulted in a lower breaking strength. An example of this type of fracture is shown in Figures B and 7A for a fiber that was almost 3 mm in length and, which exhibited an ideal breaking strength of 0.475 GPa.

Figures 7A, 7B, 7C:
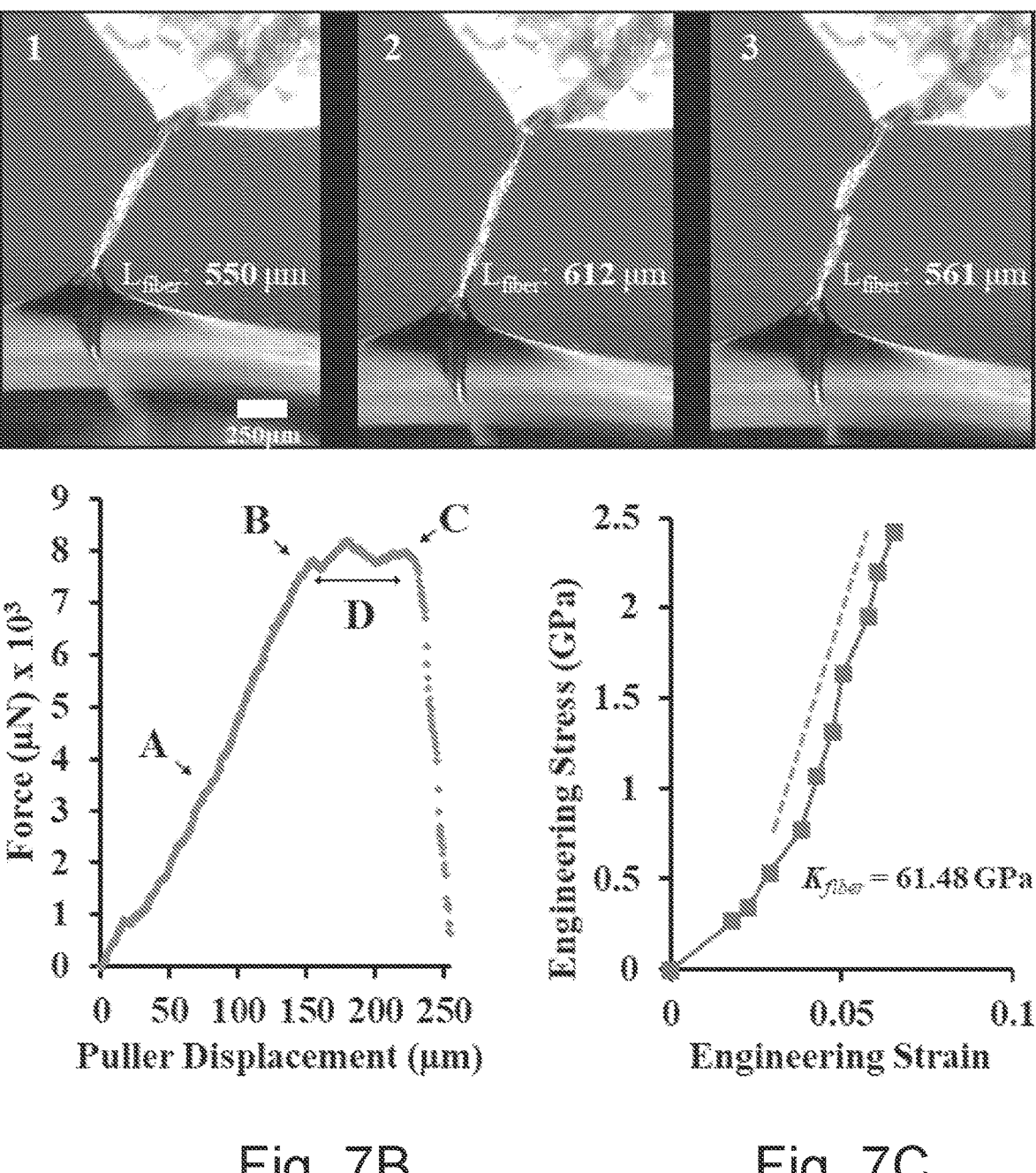
FIG. 7A illustrates uniaxial tensile testing of graphene fiber exhibiting ductile fracture. ($A_{graphene}=1.84$ μm², $r_p=0.50$ μm/s) showing three frames (1-3) from a video of a graphene fiber uniaxial tensile test: (Frame 1) Graphene fiber ($L_{fiber}=550$ μm) after straightening the macroscopic bends in the fiber; (Frame 2) Fracture initiation ($L_{fiber}$=612 μm), (Position B); (Frame 3) Post-fracture ($L_{fiber}$=561 μm).
FIG. 7B illustrates a force-distance plot of graphene fiber depicted in FIG. 7A wherein A-B represents region of the stress-strain curve (see FIG. 7C) used to calculate the fiber modulus $K_{fiber}$=61.48 GPa±2.26 GPa. Point B refers to the fracture initiation of the graphene fiber; the maximum force at point C can be used to calculate breaking strength; the graphene fiber fractured in an unzipping pattern, which is also evident by the gradual (rather than immediate) reduction to zero force; and Point D refers to the plateau region of force during unzipping of fiber.
FIG. 7C illustrates a stress-strain curve of the graphene fiber of FIG. 7A.

The ductile fracture mechanism was observed to occur primarily on the smaller fragments of a parent fiber which had already been pulled to breaking one or more times (that is, after repetitive tensile tests and eventual breaking of larger, parent fiber). This fracture mechanism was associated with a higher tensile strength in comparison to the brittle-fracture samples (see FIG. 7A-7C). FIG. 7A (Frames 1-3) depicts three video frames during the tensile testing. Frame 1 was taken after the macroscopic bends along the axis were removed by the axial movement of the puller, forming a more linear fiber. Changes in the nominal diameter and $L_{fiber}$ from this point are a combination of further unbending and elastic or plastic deformation inside the fiber. Frame 2 was right before the graphene fiber fractured; at this point $L_{fiber}$ had increased by 11.4%. The ideal breaking strength of this fiber was 2.67 GPa. Frame 3 shows the fiber after breakage, where the sum of the lengths of the broken pieces is 2.2% larger than the $L_{fiber}$ value of frame 1, representing the amount of plastic deformation that occurred during testing. These results indicate a total strain to failure for this wire of 11.4%, wherein both plastic and elastic deformation plays a role. Given that the fibers and resulting fragments underwent sequential tensile tests, lasting plastic deformation of all previous tests should be considered. Without limitation to any mechanism, the large strains to failure likely represent the unbending of kinks and folds along the axial direction of the fiber, as are, for example, visible in the SEM images of FIG. 5. The stress-strain curve for this test is shown in FIG. 7C, with a measured modulus $K_{fiber}$ value of 61.85 GPa±2.26 GPa. In comparison, moduli values for macroscale graphene-based fibers are in the range of 282 [units?].

FIGS. 8A and 8B illustrate the tensile strength measured on two fibers and their resulting fragments (until the samples were too small to handle and mount). In both cases, a gradual increase of breaking strength was observed for all sequential tensile measurements, wherein the longest fiber had the lowest breaking strength, and the shortest fragments had the highest breaking strength. Without limitation to any mechanism, it is hypothesized that such behaviour is partially a result of fibers fracturing and breaking at the location of their most critical flaw(s) during uniaxial testing. That mechanism results in fiber fragments which therefore only have flaw(s) of an equal or a lesser nature. The final measurement of the fiber in FIG. 8A (indicated by a solid arrow) is a fragment which exhibited ductile fracture behavior. Once again, the straightening and alignment of folds, as well as the forced removal of weaker portions of the fiber(s) during repetitive uniaxial tests, may explain the observed mechanical improvements.

FIG. 9 illustrates a plot of tensile strength of 16 measurements as a function of the fiber length. There is large variation about the average breaking strength for brittle fractures (0.45 GPa±0.20 GPa). The fibers exhibiting ductile behaviour were all smaller fragments of a parent fiber. However, this behaviour cannot simply be described using the conventional weakest-link statistics because there was no generalized correlation between length of the fiber and fracture strength (as is predicted from a statistical distribution of flaw sizes).

Figure 10:
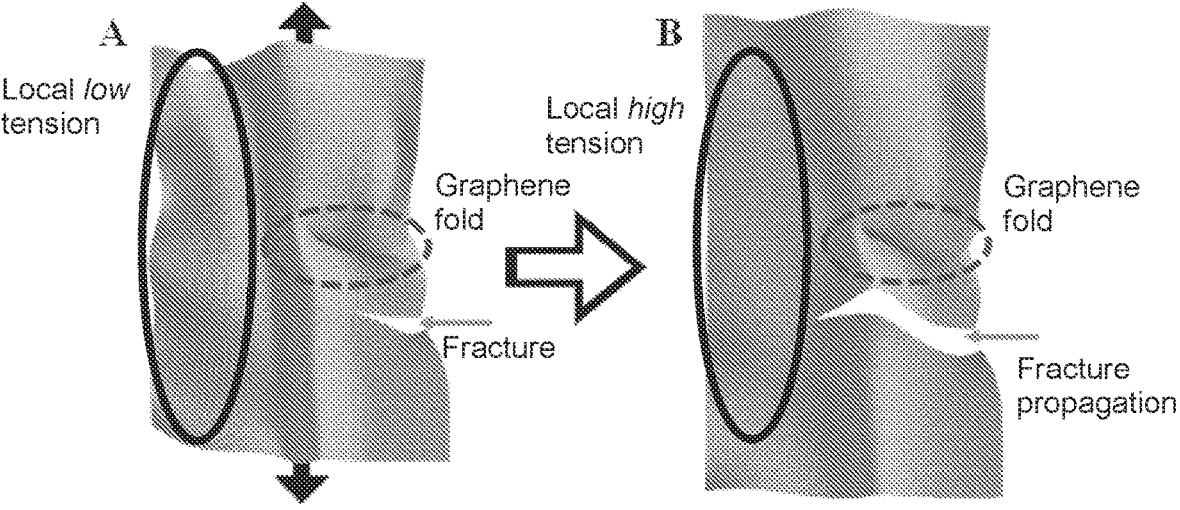
FIG. 10 illustrates schematically a potential mechanism for observed plateauing behavior in ductile fibers wherein, in the left-side, panel A of the figure, the locally folded region on the right is at high stress, causing crack propagation.

The separation of graphene fiber fragments into brittle and ductile regimes is presumed to be a function of several factors, which include the number of limiting critical defects and the structure and quality of the graphene fiber in which the crack propagates. Without limitation to any mechanism, crack propagation likely occurs through an unzipping mechanism, which has been previously reported for graphene. It has also been reported that this unzipping fracture mechanism can be heavily influenced by the surrounding environment. Without limitation to any mechanism, it was hypothesized that fracture in the graphene is occurring locally along the most energetically favourable paths (for example, grain boundaries, defects). Control of grain boundaries and sizes may lead to further enhancement of mechanical properties for these fibers. Once again, without limitation to any mechanism, it was further hypothesized that the force plateau observed in ductile fiber fragments is achieved through a global load-rebalancing mechanism. Because the graphene sheet is highly folded and the folds are in random orientations, different regions of the sheet will experience different degrees of tension. Such folds could be present at the fracturing location and oriented in a way that applied tension was not distributed. This partial loading would reduce the effective $A_{graphene}$ and calculated ideal tensile strength. As a higher-tension region fails, other portions of the fiber will take up the load. As an example, FIG. 10 provides a schematic illustration of adjacent regions of the sheet with high and low stiffness as a result of different degrees of folding. When the illustrated crack propagates into a localized region that is under lower stress, the crack will arrest, preventing catastrophic failure and transferring the load to other regions.

The folded graphene region in panel A of FIG. 10 is at high stress, causing crack or fracture formation. The fracture arrests when it approaches local low tension regions, which is not folded and therefore under lower stress at the same extension. It is only after significant further extension of the puller, illustrated in panel B of FIG. 10, that the graphene reaches a sufficient stress to continue the propagation of the fracture. During that extension, the load is thought to be constantly rebalancing between kinked portions, preventing catastrophic failure, as observed in the measurement shown in FIG. 7B.

Once again, the average breaking strength for fibers exhibiting ductile behaviour was 1.75 GPa±0.62 GPa, with the largest being 2.67 GPa at approximately 1 mm gauge length in the non-optimized, representative studies hereof. The highest breaking strength previously reported for graphene- or graphene oxide-based fibers was 2.2 GPa. It was observed that for the fibers exhibiting ductile fracture behaviour, the force remains relatively constant as the graphene fracture propagates. As the graphene unzips, the true cross-sectional area of the graphene in the fiber is continuously reduced. Therefore, the measured breaking strength values are still an underestimation of the true strength of the fibers.

In summary, representative graphene fibers were fabricated from single sheets of graphene and their mechanical properties studied. It was found that the effective tensile strength generally increases with decreasing length of the fiber for repeated tests on a single fiber. In that regard, the effective tensile strength of the studied fibers increased with each sequential tensile test measurement, a property which may be defined by the lasting plastic deformations built upon sequential tensile tensions. The representative studies hereof highlight the potential of using graphene sheets (or oxidative analogues thereof) to fabricate high performance structures.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A method of forming a fiber, comprising:
   positioning a sheet of graphene or an oxidative analogue of graphene on a surface, and applying force to the sheet to induce bending in the sheet to decrease a width of the sheet and increase an aspect ratio thereof, thereby forming the fiber.

2. The method of claim 1 wherein the oxidative analogue of graphene is graphene oxide or reduced graphene oxide.

3. The method of claim 1 wherein chemical vapor deposition is used in forming the sheet.

4. The method of claim 3 wherein the sheet is formed upon a layer of copper.

5. The method of claim 4 further comprising forming a polymer layer on the sheet before applying force thereto.

6. The method of claim 5 wherein the polymer layer comprises polymethyl methacrylate, polystyrene, or polycarbonate.

7. The method of claim 5 wherein the layer of copper is removed prior to applying force to the sheet to induce bending in the sheet and increase the aspect ratio thereof.

8. The method of claim 7 wherein the copper is removed by etching.

9. The method of claim 5 further comprising removing the polymer layer after applying force to the sheet to induce bending in the sheet and increase the aspect ratio thereof.

10. The method of claim 9 wherein the polymer layer is removed via heating the fiber to a temperature above a temperature at which thermal degradation of the polymer layer occurs.

11. The method of claim 1 wherein the fiber has a nominal diameter no greater than 500 μm.

12. The method of claim 1 wherein the fiber has a length of at least 0.5 mm and wherein the fiber or a portion thereof created by fracture under tension has a mechanical tensile strength greater than 1.45 GPa.

13. The method of claim 1 wherein the bending is induced to create folds in the sheet, to create rolling in the sheet or to create twisting in the sheet.

14. The method of claim 1 wherein the sheet has a surface area of at least 100 m²/g.

15. A fiber formed by inducing bending in a sheet of a single layer of graphene or an oxidative analogue of graphene to increase an aspect ratio thereof, thereby forming the fiber.

16. The fiber of claim 15 wherein the fiber has a nominal diameter no greater than 500 μm.

17. The fiber of claim 15 wherein the fiber has a length of at least 0.5 mm and a mechanical tensile strength greater than 1.45 GPa.

18. The fiber of claim 15 wherein the bending is induced to create folds in the sheet, to create rolling in the sheet or to create twisting in the sheet.

19. The fiber of claim 15 formed by positioning a sheet of graphene or an oxidative analogue of graphene on a surface and applying force to the sheet to induce bending in the sheet to decrease a width of the sheet and increase the aspect ratio thereof.

20. A material, comprising: a plurality of fibers wherein each of the plurality of fibers is formed from a sheet of a single layer of graphene or an oxidative analogue of graphene in which bending has been induced in the sheet to increase an aspect ratio thereof, thereby forming the fiber.

* * * * *